US008565910B2

(12) United States Patent
Behm et al.

(10) Patent No.: US 8,565,910 B2
(45) Date of Patent: Oct. 22, 2013

(54) MANUFACTURING EXECUTION SYSTEM (MES) INCLUDING A WAFER SAMPLING ENGINE (WSE) FOR A SEMICONDUCTOR MANUFACTURING PROCESS

(75) Inventors: Gary W. Behm, Hopewell Junction, NY (US); Malek Ben Salem, Wappingers Falls, NY (US); Yue Li, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 13/020,846

(22) Filed: Feb. 4, 2011

(65) Prior Publication Data
US 2012/0203369 A1 Aug. 9, 2012

(51) Int. Cl.
*G05B 13/02* (2006.01)
(52) U.S. Cl.
USPC .......................................... 700/108; 702/183
(58) Field of Classification Search
USPC ............. 700/29, 99, 100, 105, 108, 109, 121; 702/81, 82, 182, 183; 382/141; 438/8
See application file for complete search history.

(56) References Cited

U.S. PATENT DOCUMENTS

| 5,946,212 | A | 8/1999 | Bermon et al. |
| 6,442,496 | B1 | 8/2002 | Pasadyn et al. |
| 6,950,716 | B2* | 9/2005 | Ward et al. ..................... 700/121 |
| 7,006,878 | B2* | 2/2006 | Schweizerhof et al. ........ 700/51 |
| 7,296,103 | B1 | 11/2007 | Purdy et al. |
| 7,398,172 | B2 | 7/2008 | Behm et al. |
| 7,460,968 | B1 | 12/2008 | Good et al. |
| 7,565,270 | B2* | 7/2009 | Bramwell et al. ............ 702/183 |
| 7,565,271 | B2* | 7/2009 | Bramwell et al. ............ 702/183 |
| 7,571,019 | B2* | 8/2009 | Winstead et al. ............. 700/100 |
| 7,647,131 | B1 | 1/2010 | Sadowski et al. |
| 8,017,411 | B2* | 9/2011 | Sonderman et al. ............ 438/14 |
| 8,019,554 | B2* | 9/2011 | Conway et al. ................. 702/19 |
| 8,041,440 | B2* | 10/2011 | Cheng et al. ..................... 700/99 |
| 8,108,060 | B2* | 1/2012 | Tsen et al. .................... 700/108 |
| 2002/0193899 | A1 | 12/2002 | Shanmugasundram et al. |
| 2004/0121495 | A1 | 6/2004 | Sonderman et al. |
| 2006/0064262 | A1* | 3/2006 | Chang et al. .................... 702/84 |

(Continued)

OTHER PUBLICATIONS

K. Rezaie, B. Ostadi and M.R. Taghizadeh, 2006. Applications of Process Capability and Process Performance Indices.Journal of Applied Sciences, 6: 1186-1191.*

(Continued)

*Primary Examiner* — Dave Robertson
(74) *Attorney, Agent, or Firm* — Cantor Colburn LLP; Ian MacKinnon

(57) ABSTRACT

A method of sampling semiconductor wafers includes passing a lot of semiconductor wafers into a semiconductor processing tool, processing a first portion of the lot in one process chamber of the semiconductor processing tool and a second portion of the lot in another process chamber of the semiconductor processing tool to produce processed semiconductor wafers, and initiating a wafer sampling engine to select at least one of the processed semiconductor wafers for sampling. The wafer sampling engine computes a long term process capability index for the processing tool and a short term process performance index for at least one of the processing tool and process chamber, identifies at least one desired sampling measurement type, selects the at least one of the processed semiconductor wafers for sampling, and collects the desired measurement types from the at least one of the processed semiconductor wafers selected for sampling.

18 Claims, 4 Drawing Sheets

(56) References Cited

U.S. PATENT DOCUMENTS

| | | | |
|---|---|---|---|
| 2008/0021585 A1* | 1/2008 | Cheng et al. | 700/110 |
| 2009/0306803 A1* | 12/2009 | Behm et al. | 700/109 |
| 2010/0017009 A1* | 1/2010 | Baseman et al. | 700/109 |
| 2011/0161030 A1* | 6/2011 | Niu et al. | 702/81 |
| 2012/0029662 A1* | 2/2012 | Cheng et al. | 700/29 |
| 2012/0316818 A1* | 12/2012 | Baseman et al. | 702/82 |

OTHER PUBLICATIONS

Timothy L. Bittleston; Cpk and Ppk: One Capability Index Is Not Enough to Measure Photomask CD Performance. Proc. SPIE 4889, 22nd Annual BACUS Symposium on Photomask Technology, 836 (Dec. 24, 2002).*

Lafferty et al., "Equipment Productivity Improvement via Inline Qualification Implementation" IEEE/Semi Advanced Semiconductor Manufacturing Conference, 2002, pp. 218-222.

Su et al., "On the interaction between measurement strategy and control performance in semiconductor manufacturing" Journal of Process Control 18 (2008) pp. 266-276.

Tomlinson et al., "Development of Cost Effective Sampling Strategy for In-line Monitoring" IEEE/SEMI Advanced Semiconductor Manufacturing Conference, 1997, pp. 8-12.

* cited by examiner

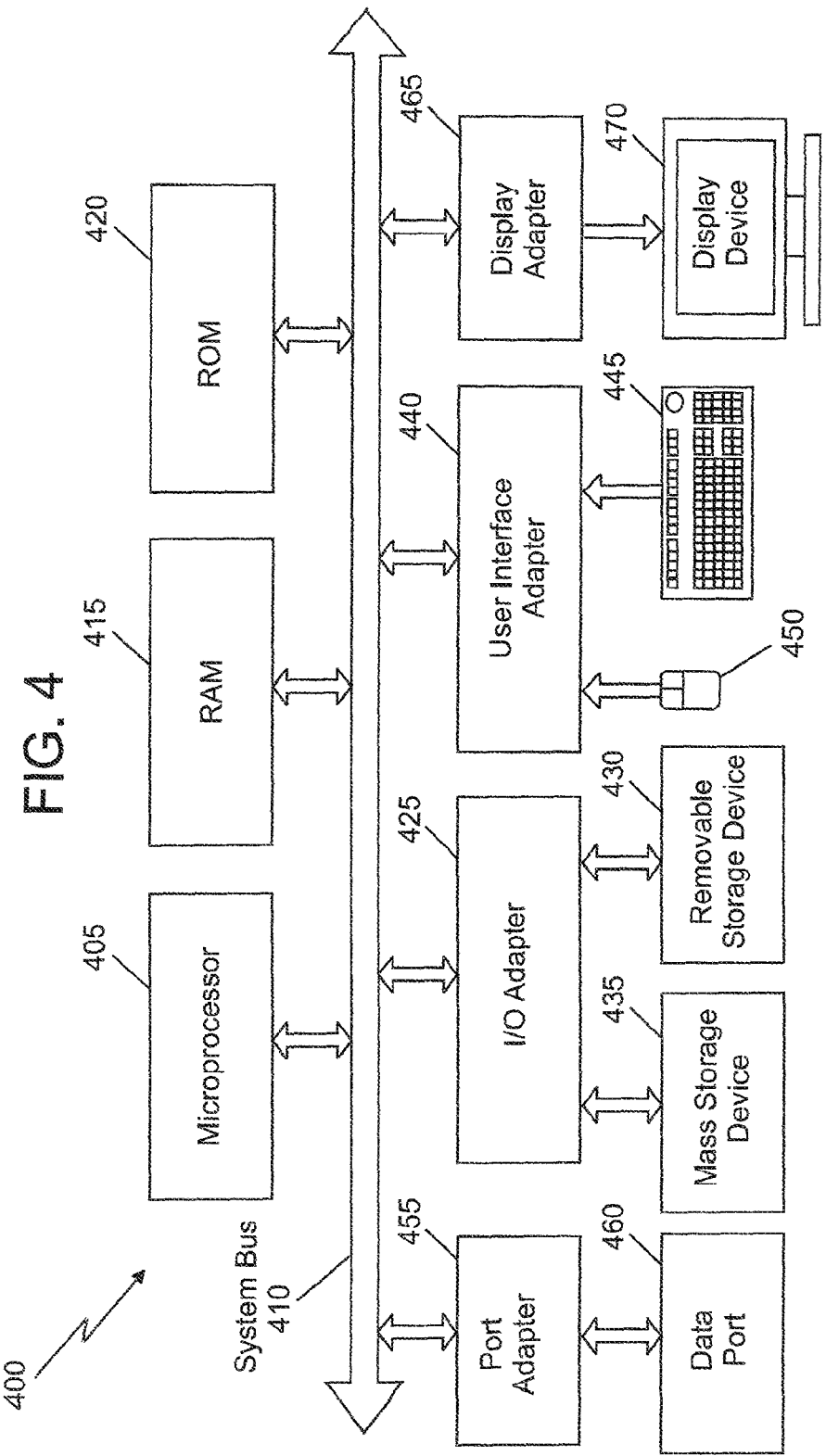

MANUFACTURING EXECUTION SYSTEM (MES) INCLUDING A WAFER SAMPLING ENGINE (WSE) FOR A SEMICONDUCTOR MANUFACTURING PROCESS

BACKGROUND

Exemplary embodiments relate to the art of semiconductor manufacturing and, more specifically, to a wafer sampling engine for a semiconductor wafer manufacturing execution system.

Semiconductor fabrication relies on multiple precise operations to produce semiconductor wafers. In order to enhance production reliability, semiconductor wafers are sampled during production. Sampling ensures that a particular tool is operating within prescribed tolerance limits. While, sampling helps engineers determine that processes are working properly, too much sampling can unnecessarily add to production time. In contrast, too little sampling, could allow a tool or tool chamber to stray from the prescribed tolerance and negatively impact production quality.

Conventional sampling engines employ three separate sampling functions. More specifically, engineers can set the sampling engine to sample either top or bottom wafers, conduct even or odd sampling, or to sample randomly. In top or bottom sampling, one or more wafers are sampled from either a top or a bottom of the lot. When set for even/odd sampling, the sampling engine samples either only even numbered wafers or odd numbered wafers. When set for random sampling, the sampling engine randomly selects wafers to be sampled. Other sampling engines utilize chamber and processing qualities to control wafer processing paths, or use monitor wafers to check tool performance. Still other sampling engines reorganize wafers in a lot based on sampling data.

SUMMARY

According to one exemplary embodiment, a method of sampling semiconductor wafers includes passing a lot of semiconductor wafers into a semiconductor processing tool, processing a first portion of the lot in one process chamber of the semiconductor processing tool and a second portion of the lot in another process chamber of the semiconductor processing tool to produce processed semiconductor wafers, and initiating a wafer sampling engine to select at least one of the processed semiconductor wafers for sampling. The wafer sampling engine computes a long term process capability index for the processing tool and a short term process performance index for at least one of the processing tool and process chamber, identifies at least one desired sampling measurement type, selects the at least one of the processed semiconductor wafers for sampling, and collects the desired measurement types from the at least one processed semiconductor wafers selected for sampling.

System and computer program products for executing the method are also described and claimed herein.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is a schematic block diagram of a general-purpose computer suitable for practicing the present invention exemplary embodiments.

DETAILED DESCRIPTION

Figure 1:
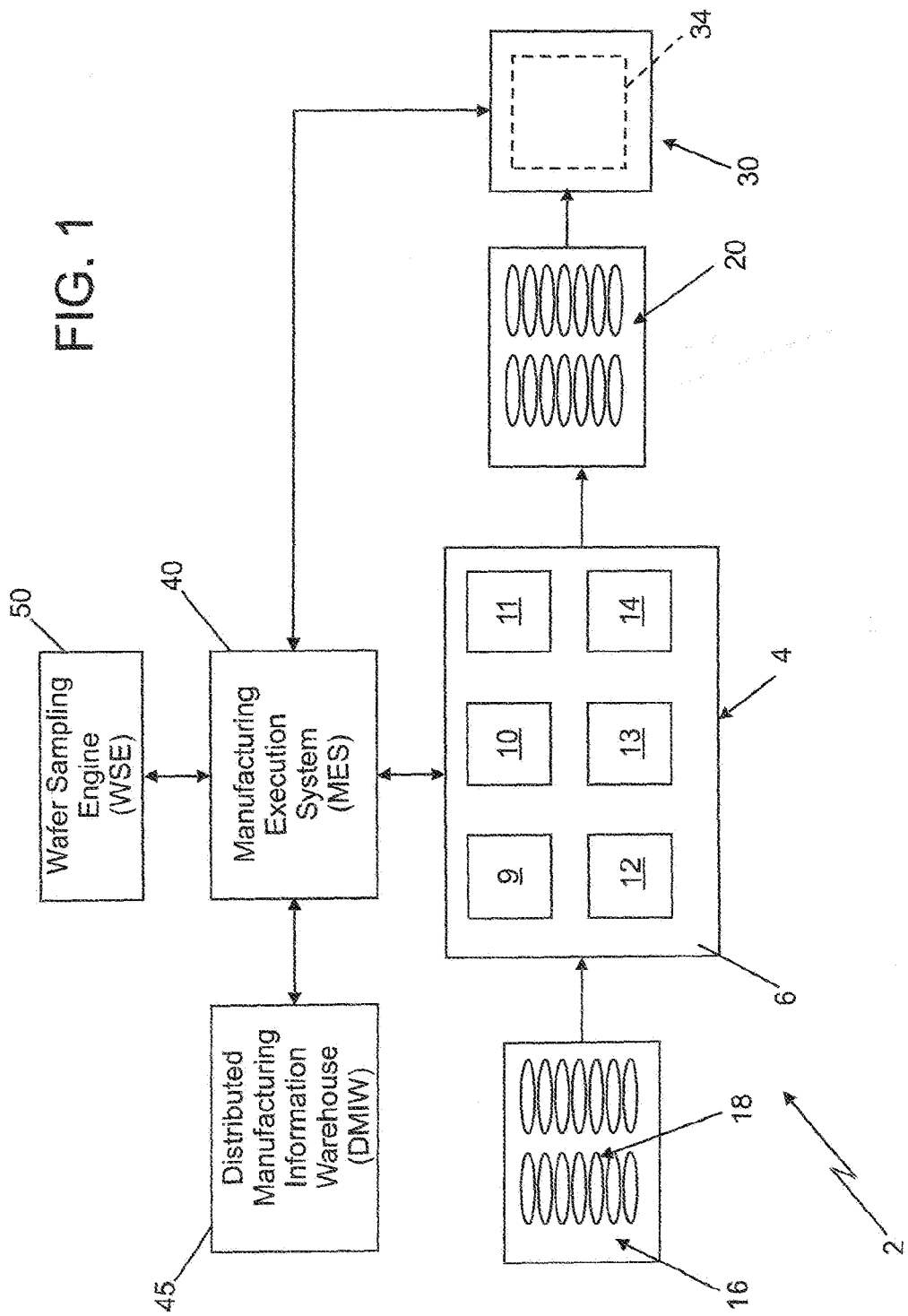
FIG. 1 is a schematic diagram of a semiconductor manufacturing system including a manufacturing execution system in accordance with an exemplary embodiment.

With reference now to FIG. 1, a semiconductor manufacturing system in accordance with an exemplary embodiment is indicated generally at 2. Semiconductor manufacturing system 2 includes a processing tool 4 having a process space 6 within which are arranged a plurality of process chambers 9-14. Processing tool 4 performs one or more operations on a process lot 16 having a plurality of pre-processed semiconductor wafers 18. Process tool 4 may be configured to perform, for example, lithography, film deposition, metal etching, and the like. Following the one or more operations, process lot 16 exits processing tool 4 as a plurality of processed semiconductor wafers 20. Processed semiconductor wafers 20 exit processing tool 4 and pass to a measurement system 30 having at least one metrology tool 34. As will be discussed more fully below, metrology tool 34 performs desired measurement operations on one or more of the processed semiconductor wafers 20 designated to be sampled.

In accordance with an exemplary embodiment, processing tool 4 and measurement system 30 are operatively coupled to a manufacturing execution system (MES) 40. MES 40 controls the processing operations in processing tool 4, the measurement operations in measurement system 30, as well as additional processing tools and measurement systems (not shown) that are configured to perform additional process operations either before, or after processing tool 4. In further accordance with the exemplary embodiment, MES 40 is operatively coupled to a distributed manufacturing information warehouse (DMIW) or database 45 and a wafer sampling engine (WSE) 50 which, as will be discussed more fully below, selects one or more of processed wafers 20 for sampling in measurement system 30. DMIW 45 contains long-term data relating to semiconductor manufacturing system 2 such as process data, testing data, recipe data and the like. At this point it should be understood that DMIW 45 could also be configured as a centralized manufacturing information warehouse data base and MES 40 could include any database that collects process measurement data.

Figure 2:
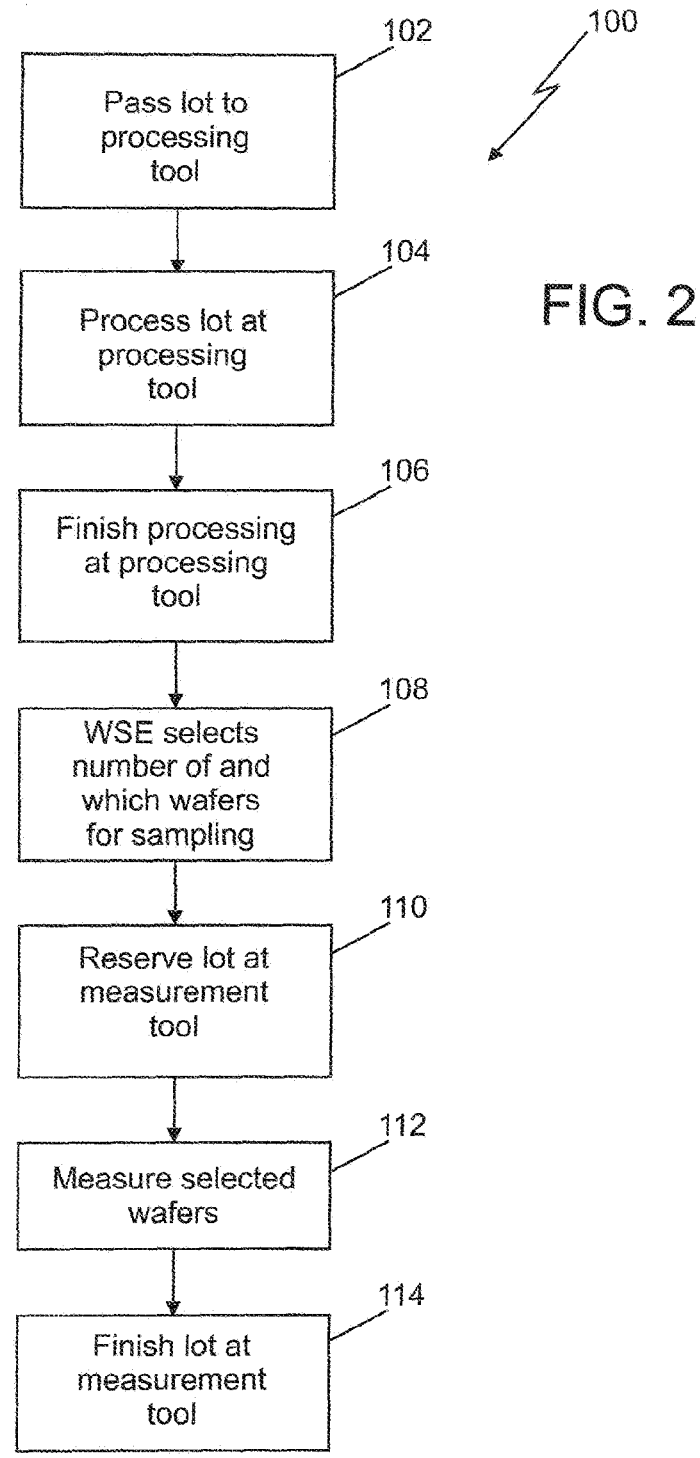
FIG. 2 is a flow chart illustrating a method for processing a lot of semiconductor wafers at a processing tool.

Reference will now be made to FIG. 2 in describing a method 100 of processing process lot 16 in processing tool 4. Initially, process lot 16 is passed to processing tool 4 as indicated in block 102. The plurality of pre-processed wafers 18 are passed through various ones of process chambers 9-14 as determined by MES 40 as indicated in block 104. That is, a first portion of pre-processed wafers 18 may pass through, for example, process chambers 9-11, while a second portion of pre-processed wafer 18 may pass through, for example, process chamber 12-14. Once all operations are complete, process lot 16 is finished processing and processed wafers 20 exit processing tool 4 as indicated at block 106. As will be detailed more fully below, WSE 50 determines how many and which of processed wafers 20 should be sampled as indicated in block 108 and process lot 16 is passed into measurement system 30 as indicated in block 110. Selected ones of processed wafers 20 are measured at measurement tool 34 as indicated in block 112. Once all desired measurement types are taken, process lot 16 is finished at measurement system 30 as indicated in block 114. At this point, process lot 16 can be passed to a new processing tool (not shown) or to packaging.

Figure 3:
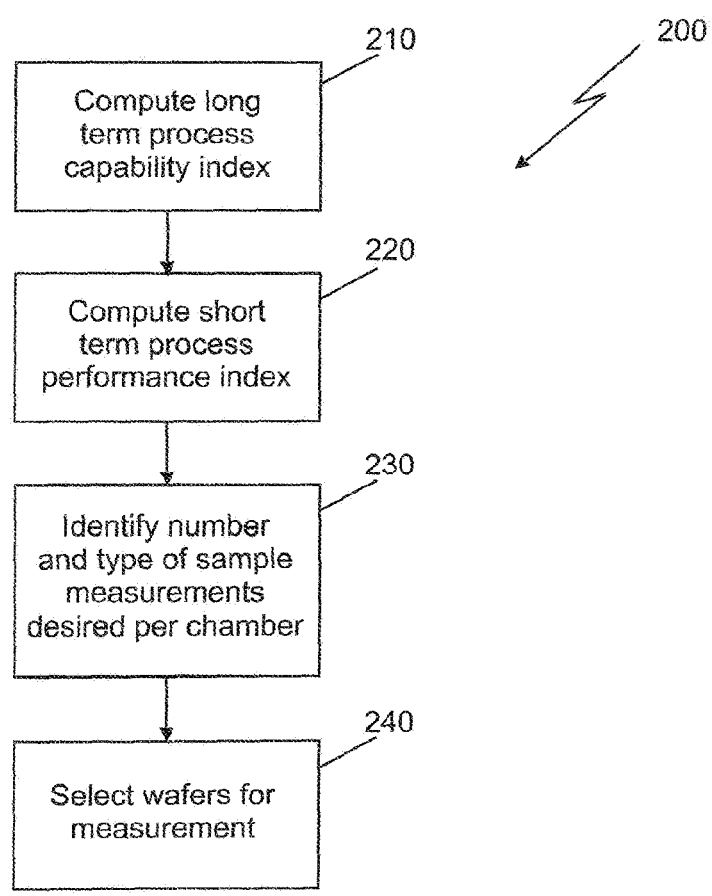
FIG. 3 is a flow chart illustrating a method of selecting semiconductor wafers processed at the processing tool for sampling.

Reference will now be made to FIG. 3 in describing a method 200 for selecting processed semiconductor wafers 20 for sampling. As indicated above, once process lot 16 has exited processing tool 4, WSE 50 determines how many and which of processed wafers 20 should be sampled. WSE 50 computes a long term process capability index for each process chamber 9-14 as indicated in block 210. In accordance with one aspect of the exemplary embodiment, the long term process capability index takes the form of a CpK index that is based on data pertaining to each process chamber 9-14 stored in DMIW 45. The CpK index is based on six sigma statistical process performance. The CpK index is a statistical computation that adjusts Cp, a simple and straight forward process capability statistical calculation for non-centered distribution.

WSE 50 also computes a short term process performance index for processed wafers 20 as indicated in block 220. In accordance with one aspect of the exemplary embodiment, the short term process performance index takes the form of a PpK index that is based on data obtained from MES 40 pertaining to each process chamber 9-14. The PpK index is a statistical calculation that adjusts Pp, a simple, straight forward indicator of process performance for the effect of a non-centered distribution. Typically, data samples of the PpK represent a subset of the data samples employed to calculate the CpK index. WSE 50 identifies how many and what form of sampling measurement types are needed for each process chamber 9-14 as indicated in block 230. For example, processed wafers 20 may be selected based upon chamber performance for processing tool 4 stored in MES 40. That is, the chamber history stored in MES 40 may indicate that one or more of process chambers 9-14 are diverging from a desired tolerance. Process chambers exhibiting a divergence from the desired tolerance may require additional focus. More specifically, wafers passing through process chambers that exhibit a divergence may require measurement in multiple areas and/or specific measurement types in order to determine when process chamber adjustments may be required.

In addition to chamber history, processed wafers 20 may be selected for sampling based upon user defined rules. Examples of user defined rules include whether a chamber has a long term process capability index between 4.0 and 2.0; and a short term process performance index between about 1.0 and 1.5. If the chamber's long term process capability index and short term process performance index fall within the above ranges, then for that chamber, select x wafers for sampling, where x is a non-negative integer defined by the user. Another rule could include whether a chamber has a long term process capability index between 4.0 and 2.0; and a short term process performance index less than 1.0. If so, then for that chamber, select two wafers for sampling. In any case, based upon the long term process capability index and short term process performance index, as well as any user defined rules, WSE 50 selects various ones of processed wafers 20 for sampling as indicated in block 240. In addition, WSE 50 ensures that a representative wafer processed in each process chamber 9-14 is selected for sampling. In this manner, WSE 50 enhances wafer sampling so as to more proactively track process chamber performance.

At this point it should be understood that WSE 50 improves wafer sampling by establishing a sampling plan required for processing wafers through measurement/metrology/inspection operations by utilizing history information from a processing tool to select wafers to be sampled. By selecting wafers that have passed through each processing chamber as well as utilizing long and short term process performance indexes and chamber history, the WSE in accordance with the exemplary embodiments can reduce mean time to detect (MTTD) any failures by as much as 50%.

Generally, the method of selecting processed semiconductor wafers for sampling described herein is practiced with a general-purpose computer and the method may be coded as a set of instructions on removable or hard media for use by the general-purpose computer. FIG. 4 is a schematic block diagram of a general-purpose computer suitable for practicing the present invention embodiments. In FIG. 4, computer system 400 has at least one microprocessor or central processing unit (CPU) 405. CPU 405 is interconnected functionally, via a system bus 410, to a random access memory (RAM) 415, a read-only memory (ROM) 420, an input/output (I/O) adapter 425 connecting to a removable data and/or program storage device 430 and/or a mass data and/or program storage device 435, a user interface adapter 440 connecting to a keyboard 445 and a mouse 450, a port adapter 455 connecting to a data port 460, and a display adapter 465 connecting to a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As discussed above, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of sampling semiconductor wafers, the method comprising:

passing a lot of semiconductor wafers into a semiconductor processing tool;

processing the a first portion of the lot in one process chamber of the semiconductor processing tool and a second portion of the lot in another process chamber of the semiconductor processing tool to produce processed semiconductor wafers; and initiating a wafer sampling engine to select at least one of the processed semiconductor wafers for sampling, the wafer sampling engine computing a long term process capability index for the processing tool, computing a short term process performance index for at least one of the processing tool and process chamber, identifying at least one desired sampling measurement type, selecting the at least one of the processed semiconductor wafers for sampling, and collecting the desired measurement types from the at least one of the processed semiconductor wafers selected for sampling.

2. The method of claim 1, wherein the wafer sampling engine selects at least one processed semiconductor wafer from the first portion and at least one processed semiconductor wafer from the second portion.

3. The method of claim 1, further comprising: increasing the number of processed semiconductor wafers to be sampled based on the short term process performance index.

4. The method of claim 1, wherein computing the long term process capability index comprises determining a CpK index based on data from a distributed manufacturing database.

5. The method of claim 1, wherein computing the short term performance capability index comprises determining a PpK index based on data from a manufacturing execution system.

6. The method of claim 1, wherein selecting the at least two processed semiconductor wafers for sampling includes selecting the at least two processed wafers based one or more of the long term process capability index, the short term process performance index, and a chamber history for the semiconductor processing tool.

7. A system for sampling semiconductor wafers in a semiconductor manufacturing process, the system comprising:
   memory for storing a program; and
   a processor functionally coupled to the memory, the processor being configured to be responsive to computer-executable instructions contained in the program and configured to implement a method comprising:
   passing a lot of semiconductor wafers into a semiconductor processing tool;
   processing a first portion of the lot in one process chamber of the semiconductor processing tool and a second portion of the lot in another process chamber of the semiconductor processing tool to produce processed semiconductor wafers; and
   initiating a wafer sampling engine to select at least two of the processed semiconductor wafers for sampling, the wafer sampling engine computing long term process capability index, computing short term process performance index for the processing tool, identifying at least one desired sampling measurement type, selecting the at least two of the processed semiconductor wafers for sampling, and collecting the desired measurement types from the one or more of the processed semiconductor wafers selected for sampling.

8. The system of claim 7, wherein the computer-executable instructions, when executed by the processor, causes said system to select at least one processed semiconductor wafer from the first portion and at least one processed semiconductor wafer from the second portion.

9. The system of claim 7, wherein the computer-executable instructions, when executed by the processor, causes said system to increase the number of processed semiconductor wafers to be sampled based on the short term process performance index.

10. The system of claim 7, wherein the computer-executable instructions, when executed by the processor, causes said system to compute a CpK index based on data from a distributed manufacturing information warehouse to determine the long term process capability index.

11. The system of claim 7, wherein the computer-executable instructions, when executed by the processor, causes said system to compute a PpK index from a manufacturing execution system to determine the short term process performance index.

12. The system of claim 7, wherein the computer-executable instructions, when executed by the processor, causes said system to select the at least two of the processed wafers based one or more of the long term process capability index, the short term process performance index, and a chamber process history for the semiconductor processing tool.

13. A computer program product for selecting semiconductor wafers for sampling in a semiconductor manufacturing system, the computer program product comprising a non-transitory storage medium readable by a processing circuit and storing instructions for execution by the processing circuit for performing a method comprising:
   passing a lot of semiconductor wafers into a semiconductor processing tool;
   processing the first portion of the lot in one process chamber of the semiconductor processing tool and a second portion of the lot in another process chamber of the semiconductor processing tool to produce processed semiconductor wafers; and
   initiating a wafer sampling engine to select the processed semiconductor wafers for sampling, the wafer sampling engine computing long term process capability index, computing short term process performance index for the processing tool, identifying at least one desired sampling measurement type, selecting the at least two of the processed semiconductor wafers for sampling, and collecting the desired measurement types from the one or more of the processed semiconductor wafers selected for sampling.

14. The computer program product of claim 13, wherein instructions, when executed by the processing circuit, selects at least one processed semiconductor wafer from the first portion and at least one processed semiconductor wafer from the second portion.

15. The computer program product of claim 13, wherein instructions, when executed by the processing circuit, increases the number of processed semiconductor wafers to be sampled based on the short term process performance index.

16. The computer program product of claim 13, wherein instructions, when executed by the processing circuit, computes a CpK index based on data from a distributed manufacturing information warehouse database to determine the long term process capability index.

17. The computer program product of claim 13, wherein instructions, when executed by the processing circuit, computes a PpK index from a manufacturing execution system, to determine the short term process performance index.

18. The computer program product of claim 13, wherein instructions, when executed by the processing circuit, selects the at least one of the processed wafers based one or more of the long term process capability index, the short term process performance index, and a chamber process history for the semiconductor processing tool.

* * * * *